May 8, 1934. S. PETERS 1,957,847
MIRROR
Filed Oct. 24, 1932   2 Sheets-Sheet 1

Inventor
SIDNEY PETERS
By [signature]
Attorney

May 8, 1934.  S. PETERS  1,957,847
MIRROR
Filed Oct. 24, 1932   2 Sheets-Sheet 2
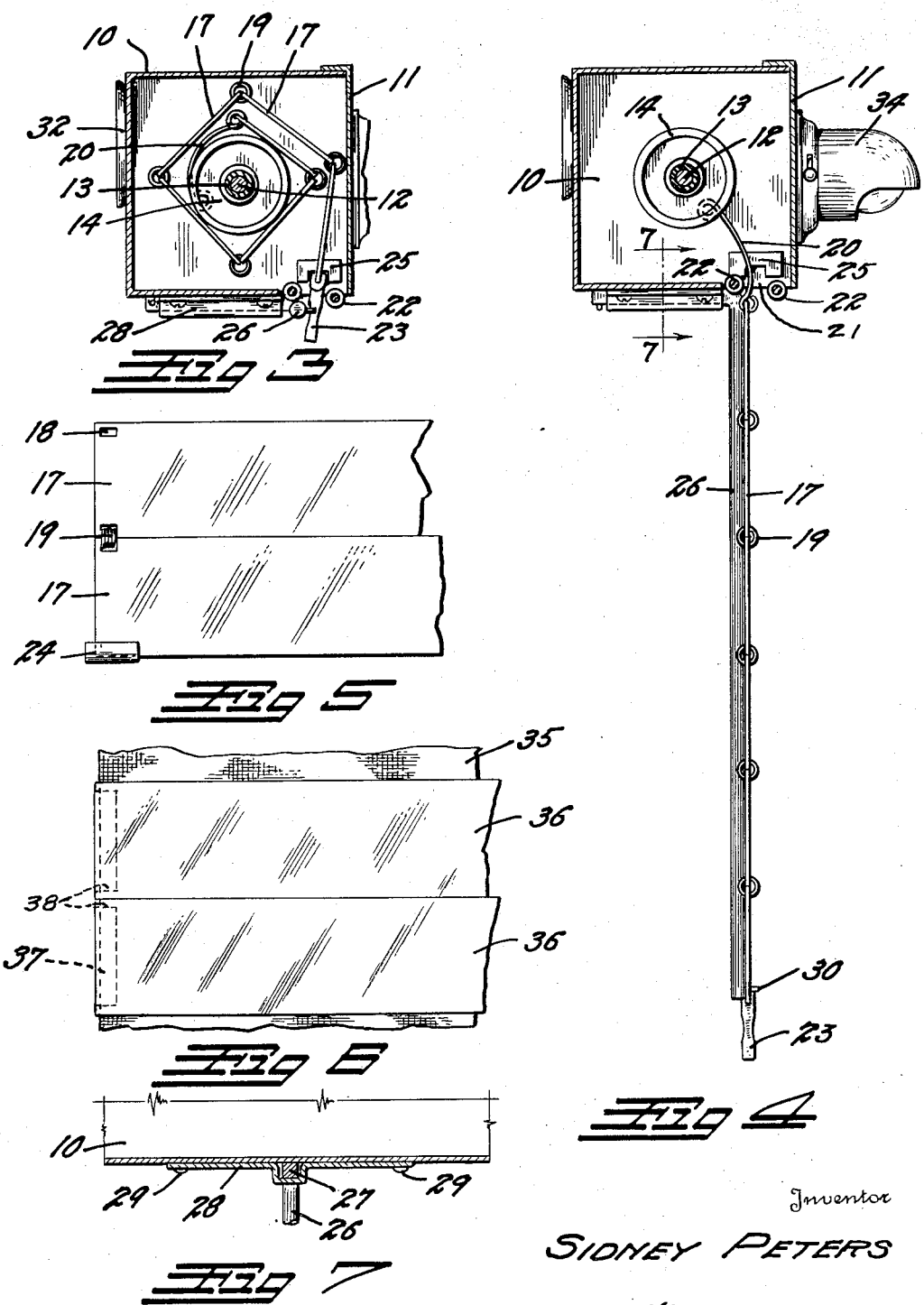
Inventor
SIDNEY PETERS Patented May 8, 1934

1,957,847

UNITED STATES PATENT OFFICE 1,957,847

MIRROR

Sidney Peters, Denver, Colo.

Application October 24, 1932, Serial No. 639,226

9 Claims. (Cl. 45—97)

This invention relates to a mirror, more particularly to a compact portable mirror designed for use in an automobile, on windows, or elsewhere the use of a large permanent mirror would be impractical.

The principal object of the invention is to provide a mirror which can be folded or rolled so as to occupy but a minimum of space when not in use, and which will provide a flat, relatively large, reflecting surface when desired.

Another object of the invention is to provide a housing for the mirror which will automatically retract and roll the mirror when it is no longer desired.

A further object is to provide means for holding the mirror perfectly flat and rigid when in use.

A still further object is to so construct the mirror that it will be practically indestructible.

Other objects and advantages reside in the detail construction of the invention, which is designed for simplicity, economy, and efficiency. These will become more apparent from the following description.

In the following detailed description of the invention reference is had to the accompanying drawings which forms a part hereof. Like numerals refer to like parts in all views of the drawings and throughout the description.

In the drawings:

Fig. 3 is a cross section taken on the line 3—3, Fig. 2, illustrating the mirror in the folded or retracted position.

Fig. 4 is a similar view illustrating the mirror in the withdrawn position for use.

Fig. 5 is a detail view illustrating the preferred method of joining the mirror sections together.

Fig. 6 is a similar view illustrating an alternate method of joining the mirror sections together.

Fig. 7 is a detail longitudinal section through the bottom of the housing taken on the line 7—7, Fig. 4, illustrating the method of hinging the mirror brace rod.

Figure 1:
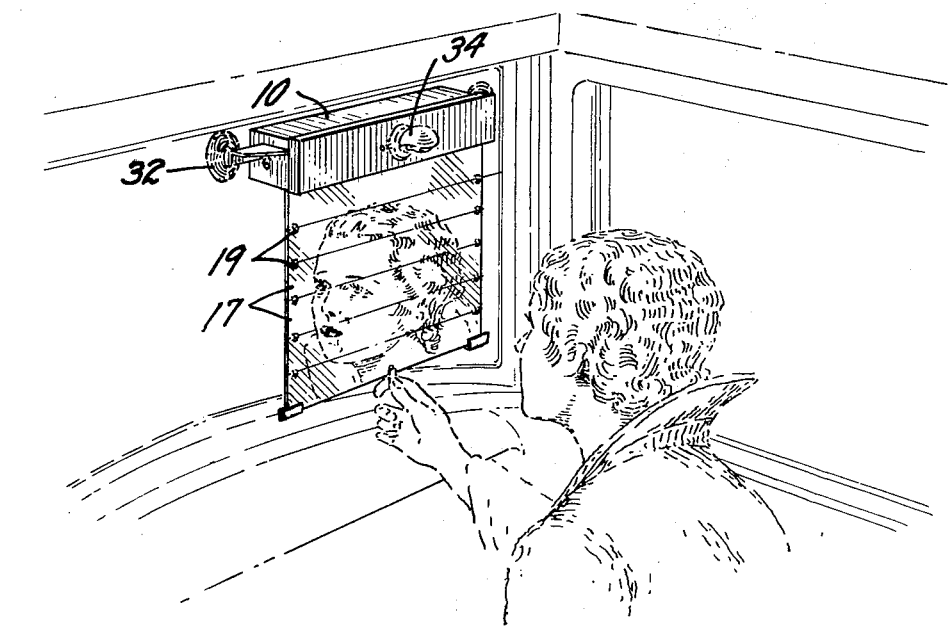
Fig. 1 illustrates the improved mirror in use on the windshield of an automobile.

The preferred embodiment of the invention comprises a housing 10, the front of which is closed by means of a removable cover 11, and a shaft 12 passing longitudinally and completely through the housing 10 to carry a rotatable winding spool. The winding spool preferably comprises a tube 13 which surrounds the shaft 12, and carries secured thereto a pair of spaced-apart spool members 14.

A coiled torque spring 15 is positioned between one of the spool members 14, and one extremity of the housing 10. This spring is connected at its extremities to the spool member and to the housing so that, as the tube 13 is rotated, the spring 15 will be wound or tightened. An attachment bar 16 may, if desired, be extended from one of the spool members 14 to the other to facilitate the attachment of the mirror to the spool.

The mirror proper consists of a series of plate sections 17, flexibly joined together so that their longitudinal edges will be in close proximity. The plates 17 are preferably formed of metal. Sheet brass, plated with chromium or nickel and highly polished to form a reflecting surface has been found to be very satisfactory.

The plate sections may be joined together in any desired manner. The preferred manner of joining them is to form small slotted openings 18 at the extremities of the plates to receive tightly coiled wire links 19 which will act to hold the adjacent plate sections together as shown in Fig. 5. This allows the plate sections to readily bend or fold with relation to each other, yet maintains them tightly adjacent each other.

The upper plate section of the series may be connected by means of a pair of connecting links 20 to the attachment bar 16 of the winding spool. The free extremity of the series projects through a slot 21 in the bottom of the housing 10. The reflecting surface is protected from the sides of the slot by means of four rollers or rounded bosses 22 positioned at opposite sides of the slot, and at each extremity thereof to engage the links 19 as the mirror passes therethrough.

The lower extremity of the mirror is provided with a suitable finger hold 23, by means of which the mirror may be readily withdrawn from the housing 10, against the tension of the spring 15. It is preferred to form two stop members 24 on the lower corners of the mirror which, when the mirror is retracted, will engage stops 25 on the end walls of the housing when the mirror has been withdrawn therein. When the stop members 24 are engaged with the stops 25, the mirror is entirely concealed and only the finger hold 23 projects from the housing, as shown in Fig. 3.

A mirror brace arm 26 is provided to maintain the mirror rigidly in its extended position. The upper extremity of the brace arm is preferably square in cross section, as shown at 27, Fig. 7. This square extremity 27 passes through a spring clip 28 on the bottom of the housing 10. The extremities of the clip 28 are secured to the housing, as shown at 29, at spaced apart positions so that the center portion of the clip may flex to allow the squared extremity 27 to rotate therein. It will be noted that this construction acts to stop and clamp the brace rod in either the fully folded position of Fig. 2 or fully extended position of Fig. 4. The lower extremity of the mirror brace arm 26 carries a pin 30 which, when the mirror is extended, extends through a suitable reception hole 31 in the lower plate.

Figure 2:
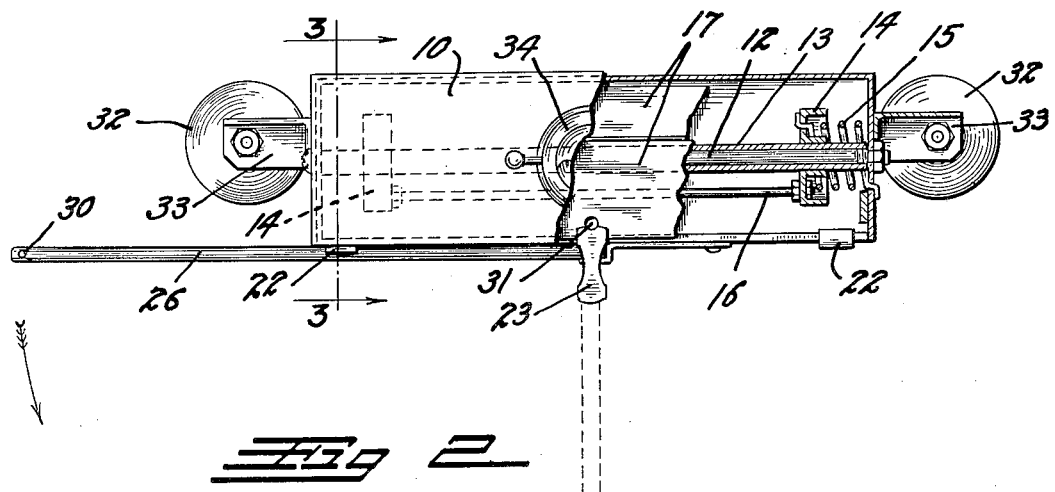
Fig. 2 is a front view thereof in the retracted or folded position. In this view, the housing and mirror are partially broken away to show the interior construction thereof.

When it is desired to use the mirror, the brace arm is swung to the broken line position "A" of Fig. 2; the finger hold 23 is gripped with the fingers and the mirror is withdrawn and hooked over the pin 30. The action of the spring 15 in pulling against the pin 30 serves to keep the entire mirror taut and flat while in use. It will also be noted that the brace arm contacts with the backs of all of the sections 17 so that it also serves to maintain the sections in perfect alignment, and in a flat plane so that the image will not be broken or distorted.

When through with the mirror, the user unhooks it from the pin 30 and the spring 15 retracts it into the housing 10. The brace rod is then swung to the folded position.

The mirror and its housing may be attached to a wall or any other supporting surface in any desired manner. It is particularly designed, however, for use on a glass surface such as the wind-shield of an automobile where it may be used as a "vanity mirror" by the lady occupants. To facilitate its attachment to such a surface, two rubber, vacuum cups 32 are provided. The cups 32 are carried on suitable brackets 33 extending from the ends of the housing 10. When pressed against a windshield or window the cups efficiently support the housing for use, as shown in Fig. 1.

If desired, the housing may be provided with a suitable light bracket 34 for holding a light bulb to illuminate the face of the user.

The plate sections of the mirror proper may be joined together in many ways. An alternate method of joining them is illustrated in Fig. 6. This method contemplates the use of a substantial cloth or similar flexible curtain 35 to which flat metallic reflecting plates 36 are secured by folding back the ends of the plates and clamping them about the edges of the curtain 35, as indicated at 37. The folded back ends are narrowed as indicated at 38 so as not to interefere with rearward folding of the curtain 35. This form of mounting the plates will be just as effective as the preferred form when new, but the curtain material eventually wears and stretches so that the plates will not be permanently maintained closely adjacent to each other.

While the invention has been particularly designed as a lady's vanity mirror for automotive vehicles it will be found equally valuable as a man's shaving mirror since it can be attached directly to a window pane where a maximum of light may be obtained.

Other devices may be used for rolling or folding the mirror. The principal object of the present invention residing in the provision of a mirror or reflecting surface capable of being rolled or folded.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. A mirror comprising a series of relatively long, relatively narrow plate-like, reflecting sections; means for hingedly connecting said sections together at their edges so that they will hang in close proximity along their longer sides when extended to form a complete mirror; means for reeling said series; and means for maintaining said sections in a common flat plane when desired, said latter means extending from and supported by said means for reeling.

2. A mirror comprising a series of relatively long, relatively narrow plate-like, reflecting sections; means for hingedly connecting said sections together so that they will lie in close proximity along their longer sides when extended to form a complete mirror; means for maintaining said sections in a common flat plane when desired, said latter means comprising: means for holding one extremity of said series; and a spring acting upon the other extremity so as to maintain said series taut when extended.

3. A collapsible mirror comprising: a series of reflecting plate sections; means for hingedly connecting said sections together; a spring actuated spool, said series being connected to said spool at its one extremity; means for maintaining the other extremity extended when desired; and a support for both said spool and said maintaining means.

4. A collapsible mirror comprising: a series of reflecting plate sections; means for hingedly connecting said sections together; a spring actuated spool, said series being connected to said spool at its one extremity; a housing for said spool; and extendable means carried by said housing for maintaining the other extremity of said series extended when desired.

5. A collapsible mirror comprising: a series of reflecting plate sections; means for hingedly connecting said sections together; a spring actuated spool, said series being connected to said spool at its one extremity; a housing for said spool; a brace arm hinged to said housing; and means for attaching the other extremity of said series to said brace arm to maintain said series extended when desired.

6. A collapsible mirror comprising: a series of reflecting plate sections; means for hingedly connecting said sections together; a spring actuated spool, said series being connected to said spool at its one extremity; a housing for said spool; a brace arm hinged to said housing; and a projection on the extremity of said brace arm adapted to engage the other extremity of said series so as to maintain the latter extended when desired.

7. A collapsible mirror comprising: a series of mirror sections provided with link openings; links passed through said openings so as to maintain said sections in close proximity; and means for maintaining said sections in a common plane when desired.

8. A collapsible mirror comprising: a series of reflecting plate sections; means for hingedly connecting said sections together; a spring actuated spool, said series being connected to said spool at its one extremity; a housing for said spool; and means carried by said housing for maintaining said plates in alignment when desired.

9. A collapsible mirror comprising: a series of plate-like, image-reflecting sections; means for hinging said sections together in close proximity so that when extended they will combine to form a single complete mirror; and means contacting all of said sections when extended for aligning them in a common flat plane.

SIDNEY PETERS.